UNITED STATES PATENT OFFICE.

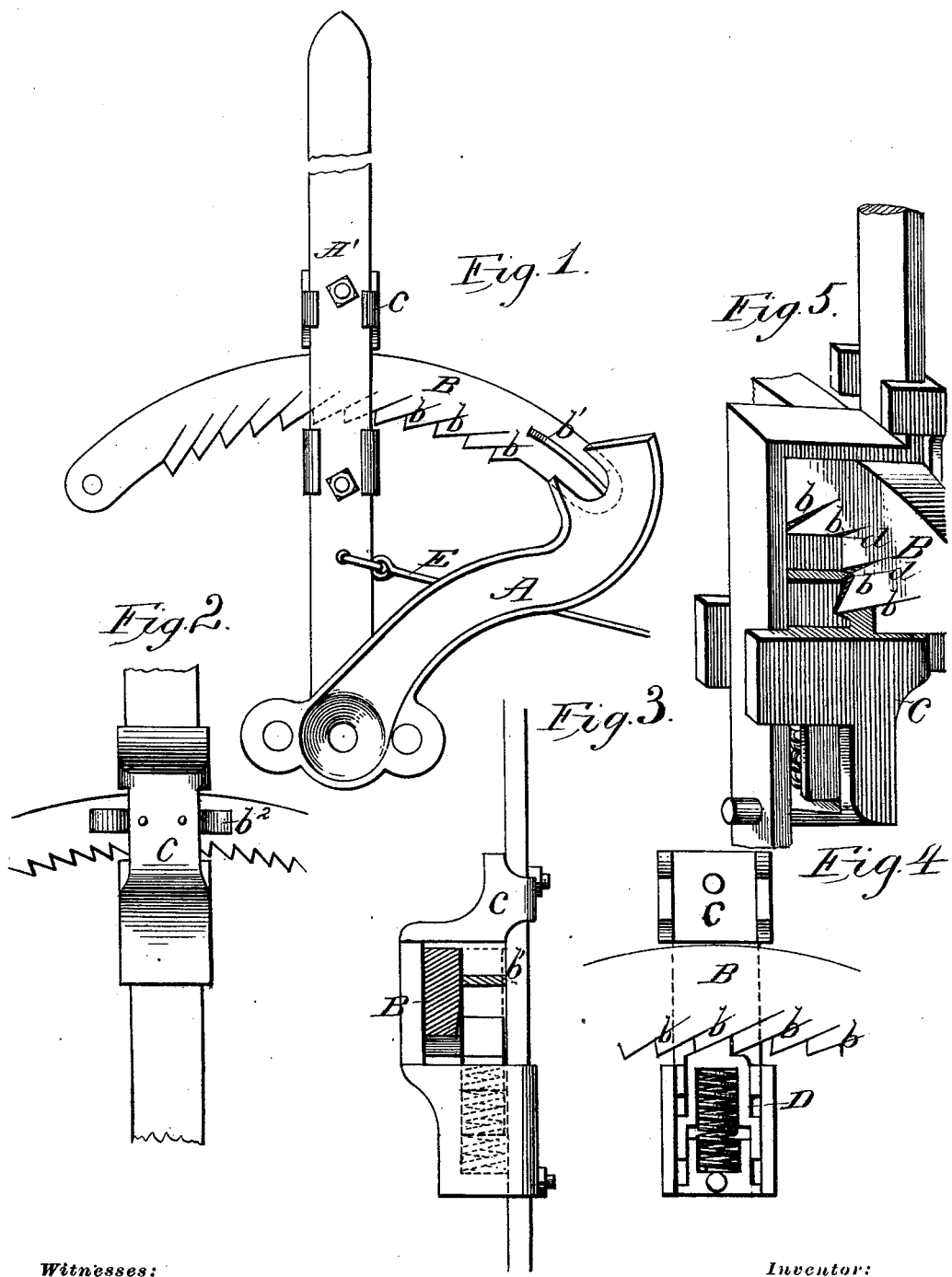

ABNER C. FISH, OF RACINE, WISCONSIN.

WAGON-BRAKE LEVER.

SPECIFICATION forming part of Letters Patent No. 229,689, dated July 6, 1880.

Application filed May 31, 1880. (No model.)

*To all whom it may concern:*

Be it known that I, ABNER C. FISH, of Racine, in the county of Racine, and in the State of Wisconsin, have invented certain new and useful Improvements in Wagon-Brakes; and I do hereby declare that the following is a full, clear, and exact description thereof.

My invention relates to wagon-brakes; and it consists in the device hereinafter described.

In the drawings, Figure 1 is a view of the side of my device which is placed next to the wagon-body. Fig. 2 is a detail viewed from the opposite side. Fig. 3 is a side view of the face-plate, the rack appearing in cross-section. Fig. 4 is a detail showing the position of the pawl in the face-plate, and Fig. 5 is a perspective view of the face-plate and portion of brake-lever, both slightly modified.

A is the bracket, to which I attach a rack, B, having the ordinary teeth and supplementary side teeth, $b$, merging into them. This rack is also provided with a stop, $b'$, the purpose of which is to prevent vibration of the lever when the brakes are off.

C is the face-plate, through which the rack passes, and which carries the pawl D. The pawl D has inclined notches $d\ d$ on its inner side, to engage with the supplementary teeth $b\ b$, as will be described farther on.

The space between the lever A' and front of the face-plate is somewhat more than twice the thickness of the pawl, so that when it is disengaged from the rack the latter may be cleared by it while the lever is being moved back and forth.

Operation: The bracket A and rack B are usually cast in one piece, the rack joining the bracket at one end and having a free end which passes between the lever A' and face-plate after the latter has been secured to the lever. The rack and bracket may then be secured to the body in the usual manner and the lever connected with the brake by the rod E. Now, by pushing the lever away from the body, and at the same time thrusting it forward, the inclined notches on the pawl will be thrown into engagement with those on the rack, and the pawl will be guided under and into engagement with the rack. To release the lever, draw it toward the body until the pawl is carried from under the rack. It will then be free to fall backward until it passes over the stop $b'$, which will fill the space between the rack and lever and prevent vibration.

A spring, $b^2$, may be found useful between the face-plate and rack.

The pawl D may be operated by either a rubber or spiral spring.

I am aware that I am not the first to invent a brake-lever which is released by a side movement that carries a lug on the lever out of engagement with the ratchet, as this has been done before, but by a construction in which the teeth are on the outside of the rack-bar, in the way and liable to catch in the clothing or in the material with which the wagon is being loaded.

By my construction I am enabled to place the teeth on the under side of the rack out of the way, as well as make, as I believe, a better device, generally, at a smaller cost.

What I claim is—

1. The combination of a face-plate and pawl with a rack passing between the face-plate and an operating-lever adapted to carry the pawl beneath and into engagement with the teeth on the under side of the rack when the brakes are being set, as described.

2. The rack having depending teeth and supplementary inclines $b\ b$ merging into them, in combination with the pawl having side inclines, $d\ d$, as set forth, a face-plate, and an operating-lever, as described.

3. The combination of a face-plate, pawl, and lever with a rack having stop $b'$, to prevent vibration, as described.

In testimony that I claim the foregoing I have hereunto set my hand this 24th day of April, 1880.

ABNER C. FISH.

Witnesses:
STANLEY S. STOUT,
E. H. BOTTUM.